(12) United States Patent  
Zhou et al.

(10) Patent No.: US 11,856,090 B2
(45) Date of Patent: Dec. 26, 2023

(54) DATA PROTECTION OPTIMIZATION

(71) Applicant: International Business Machines Corporation, Armonk, NY (US)

(72) Inventors: Hong Qing Zhou, Shanghai (CN); Yan Lin Ren, Shanghai (CN); Zong Xiong Z X Wang, Beijing (CN); Zhang Li, Han Dian District (CN); Xiao Ling Chen, Changping District (CN)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 17/356,742

(22) Filed: Jun. 24, 2021

(65) Prior Publication Data

US 2022/0417007 A1    Dec. 29, 2022

(51) Int. Cl.
*H04L 9/14* (2006.01)
*H04L 9/08* (2006.01)

(52) U.S. Cl.
CPC .......... *H04L 9/0825* (2013.01); *H04L 9/0822* (2013.01); *H04L 9/0894* (2013.01); *H04L 9/14* (2013.01)

(58) Field of Classification Search
CPC ....... H04L 9/08; H04L 9/0825; H04L 9/0894; H04L 9/00822; H04L 9/0827
See application file for complete search history.

(56) References Cited

U.S. PATENT DOCUMENTS

| 8,588,425 B1* | 11/2013 | Harwood | G06F 12/1408 380/278 |
| 9,432,342 B1* | 8/2016 | Kothari | H04L 9/0822 |
| 10,615,969 B1 | 4/2020 | Griffin | |
| 10,963,593 B1* | 3/2021 | Campagna | H04L 9/0861 |
| 11,595,191 B2* | 2/2023 | Yoshida | H04L 9/3236 |
| 2007/0206787 A1* | 9/2007 | Bell | H04L 9/0825 380/30 |
| 2014/0164776 A1 | 6/2014 | Hook | |
| 2016/0044035 A1 | 2/2016 | Huang | |
| 2018/0019985 A1* | 1/2018 | Schoof | H04L 9/3242 |
| 2020/0202013 A1 | 6/2020 | Caspi | |
| 2020/0226297 A1 | 7/2020 | Auh | |
| 2021/0044436 A1 | 2/2021 | Vijayanarayanan | |

FOREIGN PATENT DOCUMENTS

| CN | 112613051 A | 4/2021 |
| IN | 102236766 B | 4/2014 |
| KR | 101591255 B1 | 8/2014 |

OTHER PUBLICATIONS

"Distributable Secure Data Interface", An IP.com Prior Art Database Technical Disclosure, IP.com No. PCOM000264082D, Nov. 9, 2020, 11 pages.

Mell et al., "The NIST Definition of Cloud Computing", Recommendations of the National Institute of Standards and Technology, Special Publication 800-145, Sep. 2011, 7 pages.

* cited by examiner

*Primary Examiner* — Shaqueal D Wade-Wright
(74) *Attorney, Agent, or Firm* — Edward J. Wixted, III

(57) ABSTRACT

In an approach, a processor obtains an encrypted data key and a first encrypted protection key from a storage device. A processor sends the first encrypted protection key to a first device. A processor obtains a protection key from the first device, wherein the protection key is generated by the first device through decrypting the first encrypted protection key. A processor decrypts the encrypted data key using the protection key to obtain a data key.

18 Claims, 8 Drawing Sheets

DATA PROTECTION OPTIMIZATION

BACKGROUND

The present invention relates generally to the field of data security, and more particularly to methods, systems, and computer program products for data protection.

As network services are widely applied in many industries, data security in a network environment become a focused technical field. There is a need to protect data stored in network servers from unauthorized exposure and other risks.

SUMMARY

According to one embodiment of the present invention, a computer-implemented method, computer program product, and computer system are provided. A processor obtains an encrypted data key and a first encrypted protection key from a storage device. A processor sends the first encrypted protection key to a first device. A processor obtains a protection key from the first device, wherein the protection key is generated by the first device through decrypting the first encrypted protection key. A processor decrypts the encrypted data key using the protection key to obtain a data key.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Figure 1:
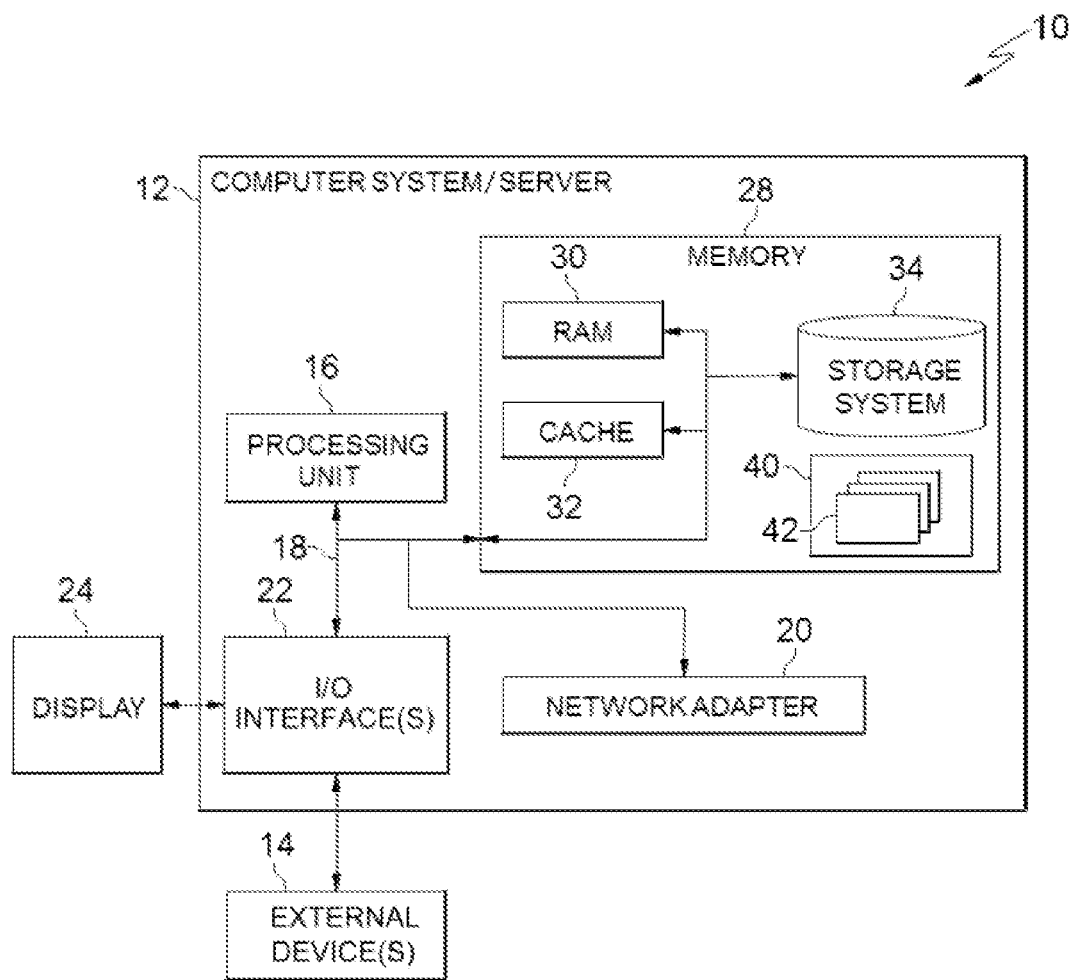
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
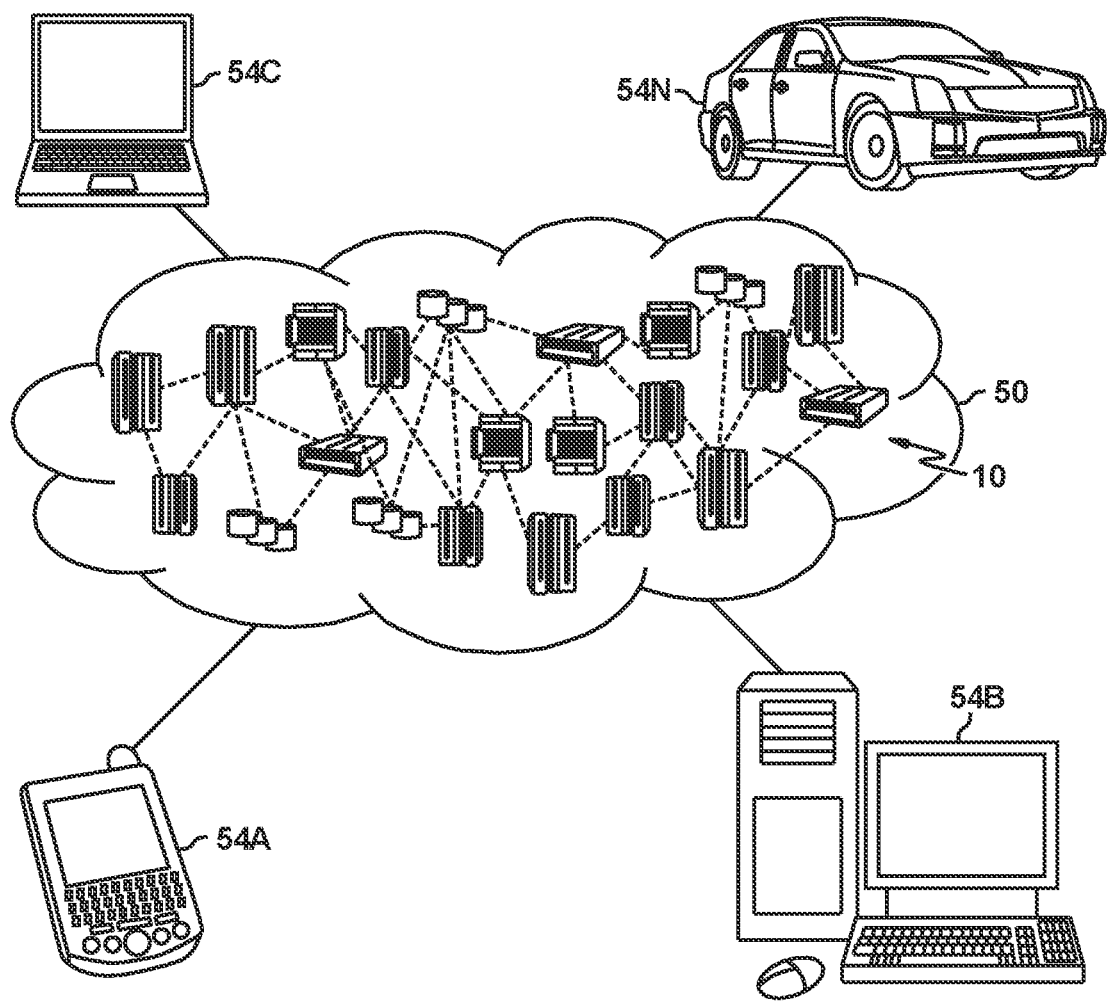
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
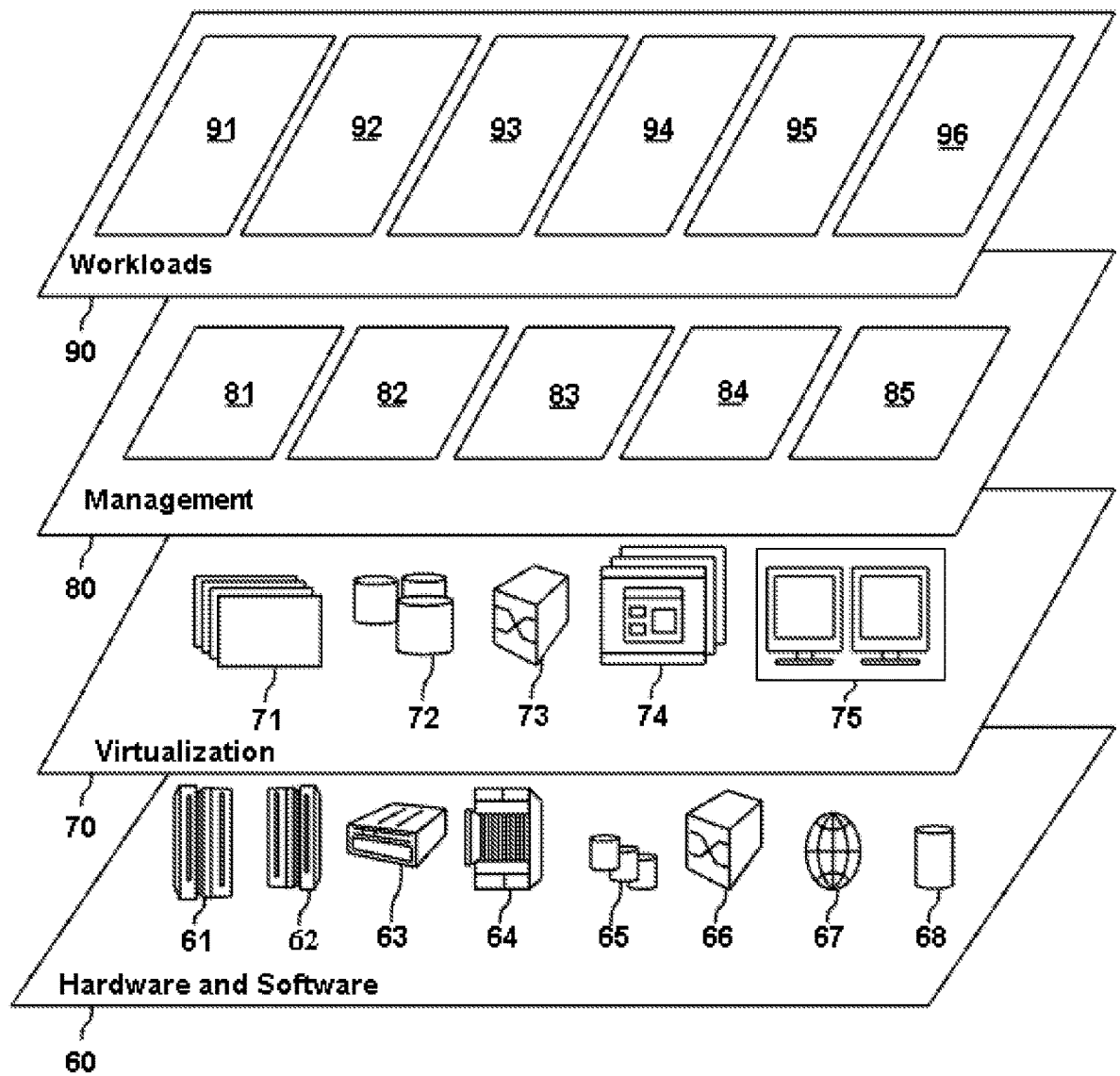
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data protection 96.

Figure 4:
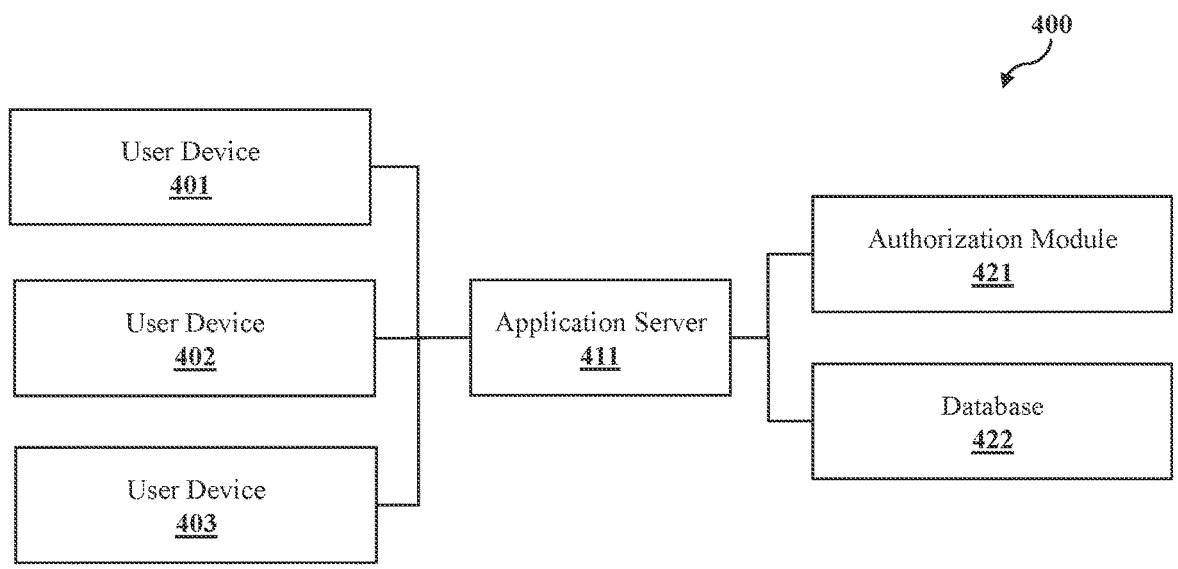
FIG. 4 depicts a schematic diagram of an example network environment according to embodiments of the present invention.

Referring now to FIG. 4, an example network environment 400 is depicted. One or more user devices (such as, a user device 401, 402, and 403) can connect to an application server 411 through communication connections. As an example, the user device 401, 402, or 403 can be the computer system/server 12 of FIG. 1, or any type of device operated in the network environment 400. The application server 411 may have a structure similar to the computer system/server 12 of FIG. 1.

Taking network storage as an example, a storage application can be deployed in the application server 411, and data from user devices (such as the user device 401, 402, and 403) can be stored in a database 422. For example, the user device 401 can send a request to the application server 411 to access data of the user device 401. The application server 411 can forward the request to an authorization module 421 and then obtain an authentication result from the authorization module 421. If the user device 401 is authenticated to be a valid user device, data corresponding to the user device 401 can be fetched by the application server 411 from the database 422, and then sent to the user device 401.

However, there is a risk that if the database is attacked, all data may be exposed without protection. Besides, the database manages authority of users at application level. Data from user devices may be exposed to some privileged database users, such as administers of the database 422, etc.

The present disclosure provides methods, systems, and computer program products to protect user data stored in a network environment.

Figure 5:
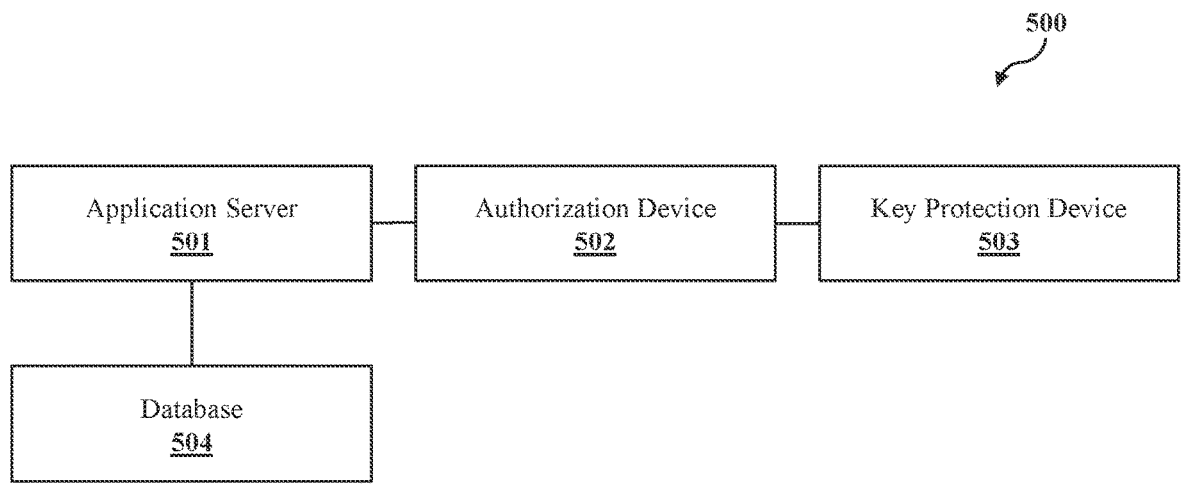
FIG. 5 depicts a schematic diagram of an example system for data protection according to embodiments of the present invention.

Referring now to FIG. 5, an example system 500 for data protection according to embodiments of the present disclosure is depicted. The system 500 for data protection comprises an application server 501, an authorization device 502, a key protection device 503, and a database 504. One or more web applications (such as, web storage application, etc.) may operate on the application server 501. There can be direct or indirect communication links among the application server 501, the authorization device 502, the key protection device 503 and the database 504. It should be understood that the system 500 may further comprise other devices, functions and/or modules which are not depicted in FIG. 5.

In some embodiments, the application server 501, the authorization device 502 and the key protection device 503 can be different physical devices isolated from each other, which means computing resources (such as, processing resources, memory resources, storage resources, and network bandwidth resources, etc.) may not be shared among the application server 501, the authorization device 502 and the key protection device 503. For example, the application server 501, the authorization device 502, and the key protection device 503 can be independent physical servers in same or different locations. In some other embodiments, the application server 501, the authorization device 502 and the key protection device 503 can be virtualized devices operating on same or different physical devices. Authority management of the application server 501, the authorization device 502 and the key protection device 503 may also be independent from each other. For example, an administer of the application server 501 may not have access authority of the authorization device 502 or the key protection device 503.

In some embodiments, the database 504 can be a device outside of the application server 501. The application server 501 may access the database 504 through communication links. In some other embodiments, the database 504 may be an internal module of the application server 501. The application server 501 may access the database 504 through internal links.

Figure 6:
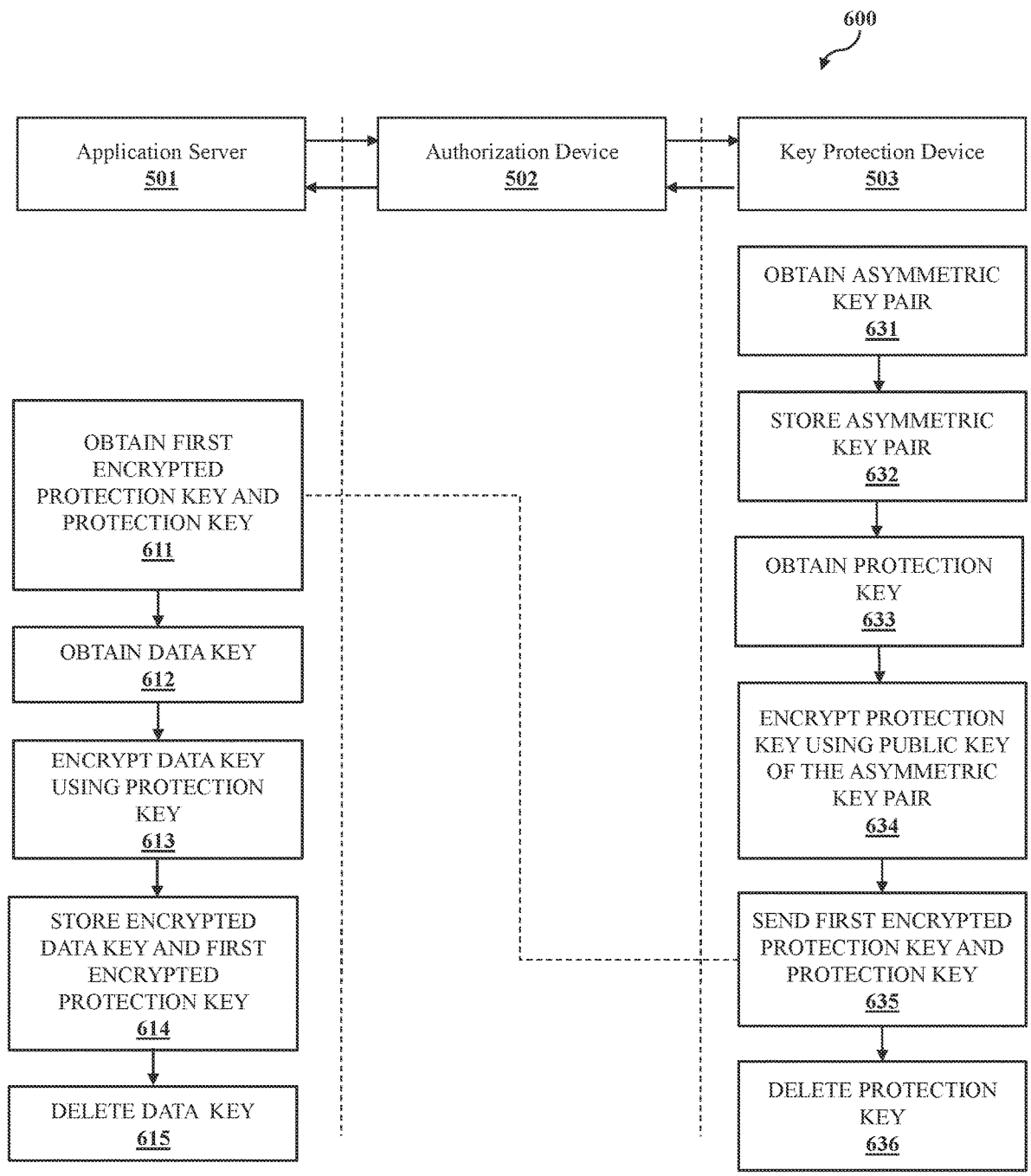
FIG. 6 depicts an example flowchart for data protection according to embodiments of the present invention.

Referring now to FIG. 6, an example flowchart 600 for data protection according to embodiments of the present disclosure is depicted. The flowchart 600 describes a process to store an encrypted data key and an encrypted protection key in a storage device if a user requests to register on the application server 501. As an example, the flowchart 600 could be implemented by computer system/server 12 of FIG. 1.

According to embodiments of the present disclosure, if a user device used by a user connects to the application server 501 for the first time, the user device may send a registration request to the application server 501. The registration request may comprise a user identifier (such as, Alice), a password, and other authentication information of the user device, etc. The registration request may further comprise a registration timestamp representing an access requesting time.

The application server 501 may forward the registration request and/or authentication information of the application server 501 to the authorization device 502. In some embodiments, if the authorization device 502 authenticates the user device and the application server 501 to be valid, the authorization device 502 may generate a set of key identifiers based on the access request for a specific user identifier. Each of the key identifiers is unique from other key identifiers. As an example, the set of key identifiers for the specific user identifier may comprise three key identifiers generated based on hash values of different combinations of the user identifier, the password and the registration timestamp, etc. The set of key identifiers can be stored in the authorization device 502 with the corresponding user identifier as a single entry. In other words, each of the set of key identifiers may relate to others of the set of key identifiers. In some examples, the set of key identifiers can be other numbers or values generated by the authorization device 502.

Table 1 describes example key identifiers generated by the authorization device 502 for a user identifier (such as, Alice). In this example, an entry can be created for each user identifier and a corresponding set of key identifiers. The set of key identifiers corresponding to a user identifier may comprise three key identifiers (such as, key identifier 1, key identifier 2, and key identifier 2). As an example, the key identifier 1 can be a hash value of the user identifier, the password and the registration timestamp. The key identifier 2 can be a hash value of the password, the registration timestamp and user identifier. The key identifier 3 can be a hash value of the registration timestamp, the user identifier and the password.

TABLE 1

Example Key Identifiers

| User Identifier | Key Identifier 1 | Key Identifier 2 | Key Identifier 3 |
|---|---|---|---|
| Alice | 4f8825b09c . . . | c9c45a8e74 . . . | 4d1e49f508 . . . |
| . . . | . . . | . . . | . . . |

The authorization device 502 may send the key identifier 1 and the key identifier 2 to the application server 501. If the authorization device 502 also authenticates the key protection device 503 to be valid, the authorization device 502 may send the key identifier 3 to the key protection device 503.

According to embodiments of the present disclosure, referring to FIG. 6, at block 631, the key protection device 503 may obtain an asymmetric key pair for the user identifier. It should be understood that any now known or to be developed asymmetric encryption/decryption technologies can be applied by the present disclosure. In some embodiments, the key protection device 503 may generate the asymmetric key pair by itself. In some other embodiments, the key protection device 503 may obtain the asymmetric key pair from an external device that generates the asymmetric key pair.

Then, at block 632, the key protection device 503 may store the asymmetric key pair in an internal or external storage device accessible by the key protection device 503. The key identifier 3 received by the key protection device 503 may also be stored corresponding to the asymmetric key pair. Table 2 describes example mapping of the key identifier 3 and the asymmetric key pair. An entry can be created for each specific key identifier 3 and its corresponding asymmetric key pair. As an example, for the key identifier 3 "4d1e49f508 . . . ", its corresponding asymmetric key pair includes a public key "X1lAc8DFp . . . " and a private key "ZX18c7XFz . . . ".

TABLE 2

Example Mapping of Key Identifier and Asymmetric Key Pair

| Key Identifier 3 | Public Key | Private Key |
|---|---|---|
| 4d1e49f508 . . . | X1lAc8DFp . . . | ZX18c7XFz . . . |
| . . . | . . . | . . . |

At block 633, the key protection device 503 may obtain a protection key. In some embodiments, the key protection device 503 may generate the protection key by itself. In some other embodiments, the key protection device 503 may obtain the protection key from an external device that generates the protection key. In some embodiment, the protection key can be a symmetric key that can be used to encrypt and decrypt files, documents and/or data. It should be understood that any now known or to be developed symmetric encryption/decryption technologies can be applied by the present disclosure. At block 634, the key protection device 503 may encrypt the protection key using the public key of the asymmetric key pair to obtain a first encrypted protection key.

At block 635, the key protection device 503 may send the first encrypted protection key and the protection key to the application server 501. In some embodiments, the key protection device 503 may send the protection key directly to the application server 501. In some other embodiments, the key protection device 503 may further encrypt the protection key using a temporary session key to obtain a second encrypted protection key, and then send the second encrypted protection key to the application server 501. The temporary session key can be a temporary public key received from the application server 501. The temporary session key can also be a temporary symmetric key assigned for the application server 501 and the key protection device 503. It should be understood that any now known or to be developed encryption technologies can be applied by the present disclosure to encrypt the to be sent protection key. At block 636, the key protection device 503 may delete the protection key.

The description turns to block 611, wherein the application server 501 may obtain the first encrypted protection key and the protection key from the key protection device 503.

In some embodiments, if the key protection device 503 sends the protection key directly at block 635, the application server 501 may directly obtain the protection key without further processing. In some other embodiments, if the key protection device 503 send the second encrypted protection key at block 635, the application server 501 may obtain the protection key through decrypting the second encrypted protection key using a corresponding temporary session key. For example, if the second encrypted protection key is encrypted using a temporary public key, the application server 501 may use a temporary private key corresponding to the temporary public key to decrypt the second encrypted protection key. If the second encrypted protection key is encrypted using a temporary symmetric key, the application server 501 may use the same temporary symmetric key to decrypt the second encrypted protection key.

At block 612, the application server 501 may obtain a data key. The data key can be used for encrypting and decrypting data corresponding to the user identifier received from the user device. At block 613, the application server 501 may encrypt the data key using the protection key to obtain an encrypted data key.

At block 614, the application server 501 may store the encrypted data key and the first encrypted protection key in a storage device accessible by the application server 501. The storage device can be a device locating inside or outside of the application server 501.

In some embodiments, the encrypted data key is stored with the key identifier 1, and the first encrypted protection key is stored with the key identifier 2. Table 3 describes example mapping of the key identifier 1 and the encrypted data key. An entry can be created for each key identifier 1 and its corresponding encrypted data key. As an example, for the key identifier 1 "4f8825b09c . . . ", the corresponding encrypted data key can be "iUlHOpa6ACWzf2 . . . ".

TABLE 3

Example Mapping of Key Identifier 1 and Encrypted Data Key

| Key Identifier 1 | Encrypted Data Key |
|---|---|
| 4f8825b09c . . . | iUlHOpa6ACWzf2 . . . |
| . . . | . . . |

Table 4 describes example mapping of the key identifier 2 and the first encrypted protection key. An entry can be created for each key identifier 2 and its corresponding encrypted first encrypted protection key. As an example, for the key identifier 2 "c9c45a8e74 . . . ", the corresponding first encrypted protection key can be "UI1Lc3VCpyR61 . . . ".

TABLE 4

Example Mapping of Key Identifier 2 and First Encrypted Protection Key

| Key Identifier 2 | First Encrypted Protection Key |
|---|---|
| c9c45a8e74 | UI1Lc3VCpvR61 |
| . . . | . . . |

At block 615, the application server 501 may delete the data key. In some embodiments, before deletion of the data key, during the current session, the application server 501 may further receive data from the user device. Then, the application server 501 may encrypt the received data using the data key and store the encrypted data in a storage device, such as the database 504. The stored encrypted data can be accessed later by a user through the user device or another user device based on the user identifier.

Figure 7:
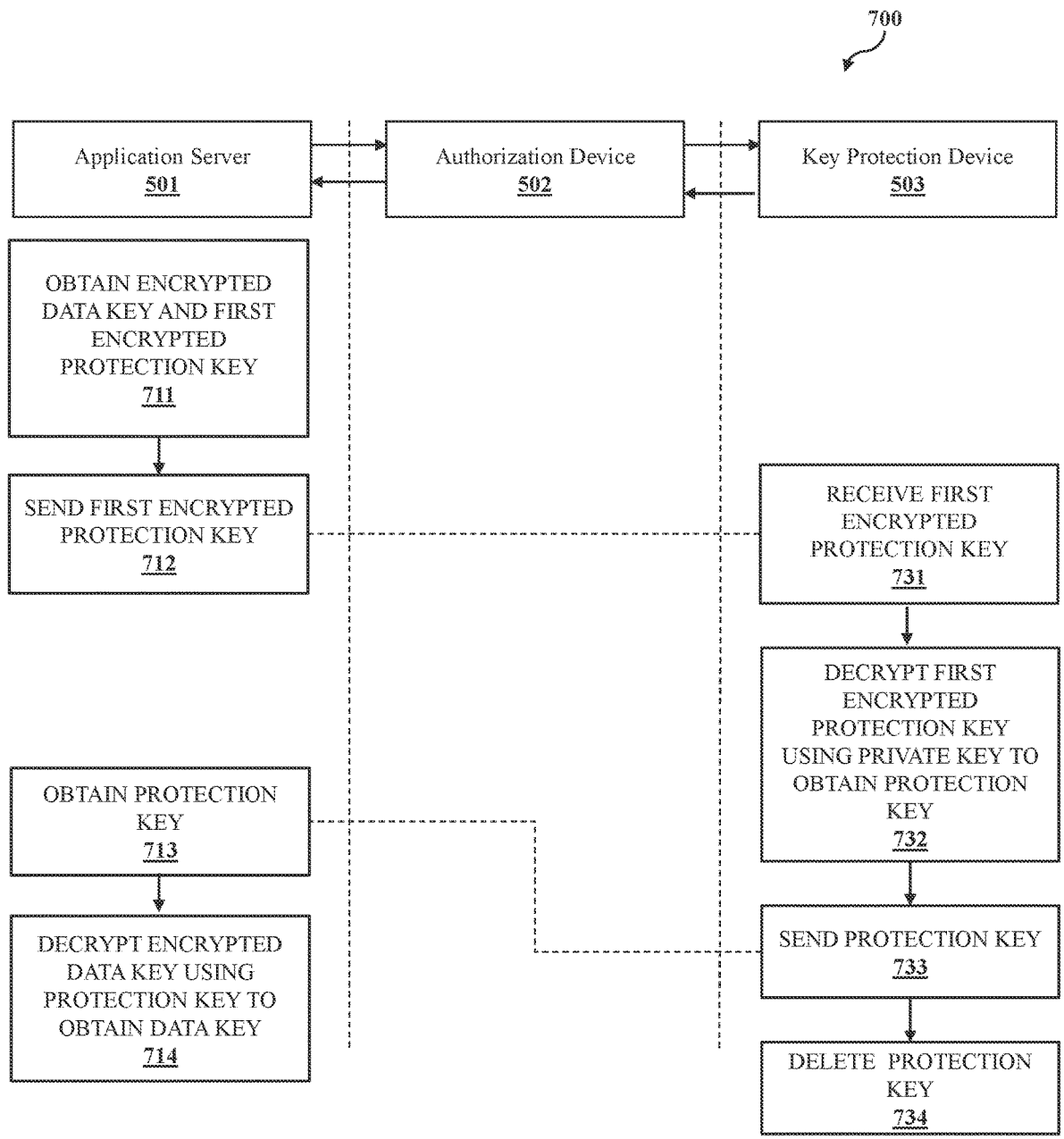
FIG. 7 depicts another example flowchart for data protection according to embodiments of the present invention.

Referring now to FIG. 7, an example flowchart 700 for data protection according to embodiments of the present disclosure is depicted. The flowchart 700 describes a process to get a data key then a user requests to access stored encrypted data of the user or store data of the user in the database 504. As an example, the flowchart 700 could be implemented by computer system/server 12 of FIG. 1

According to embodiments of the present disclosure, if a user device used by the user connects to the application server 501 for reading and/or writing data, the user device may send an access request to the application server 501. The access request may comprise a user identifier (such as, Alice), a password, and other authentication information of the user device, etc.

The application server 501 may forward the access request to the authorization device 502. In some embodiments, if the authorization device 502 authenticates the user device to be valid, the authorization device 502 may obtain the user identifier in the access request, and then search a set of key identifiers corresponding to the user identifier. For example, for the user identifier "Alice", a set of key identifiers "4f8825b09c . . . ", "c9c45a8e74 . . . " and "4d1e49f508 . . . " can be obtained by the authorization device 502. The authorization device 502 can send the key identifier 1 "4f8825b09c . . . ", the key identifier 2 "c9c45a8e74 . . . " to the application server 501 and send the key identifier 3 "4d1e49f508 . . . " to the key protection device 503.

According to embodiments of the present disclosure, at block 711, the application server 501 may obtain an encrypted data key and a first encrypted protection key through searching a storage device using the received key identifier 1 and the received key identifier 2. For example, the storage device may store entries similar to those in Table 3 and Table 4, and the received key identifier 1 and the received key identifier 2 can be used by the application server 501 as search terms to obtain the encrypted data key and the first encrypted protection key stored in the storage device. At block 712, the application server 501 may send the first encrypted protection key to the key protection device 503.

The description turns to block 731, at which the key protection device 503 may receive the first encrypted protection key from the application server 501. At block 732, the key protection device 503 may decrypt the first encrypted protection key using a private key to obtain a protection key. The private key is obtained by the key protection device 503 through searching a storage device using the received key identifier 3. For example, the storage device may store entries similar to those in Table 2, and the received key identifier 3 can be used by the application server 501 as search terms to obtain the private key stored in the storage device.

At block 733, the key protection device 503 may send the protection key to the application server 501. In some embodiments, the key protection device 503 may send the protection key directly to the application server 501. In some other embodiments, the key protection device 503 may further encrypt the protection key using a temporary session key to obtain a third encrypted protection key, and then send the third encrypted protection key to the application server 501. The temporary session key can be a temporary public key received from the application server 501. The temporary session key can also be a temporary symmetric key assigned for the application server 501 and the key protection device 503. It shall be understood that any now known or to be developed encryption technologies can be applied by the present disclosure to encrypt the to be sent protection key. In some embodiments, at block 734, the key protection device 503 may delete the protection key.

The description turns to block 713, at which the application server 501 obtain the protection key. In some embodiments, if the key protection device 503 sends the protection key directly at block 733, the application server 501 may directly obtain the protection key at block 713. In some other embodiments, if the key protection device 503 send the third encrypted protection key at block 733, the application server 501 may obtain the protection key trough decrypting the third encrypted protection key using a corresponding temporary session key. For example, if the third encrypted protection key is encrypted using the temporary public key, the application server 501 may use a temporary private key corresponding to the temporary public key to decrypt the third encrypted protection key. The temporary private key can be obtained previously by the application server 501. If the third encrypted protection key is encrypted using a temporary symmetric key, the application server 501 may use the same temporary symmetric key to decrypt the third encrypted protection key. The temporary symmetric key can be obtained previously by the application server 501.

At lock 714, the application server 501 may decrypt the encrypted data key using the protection key to obtain the data key.

According to embodiments of the present disclosure, the application server 501 may further receive data from the user device, and then encrypt the received data using the data key. The application server 501 can store encrypted data in the database 504 with the corresponding user identifier. In some embodiments, the application server 501 may obtain encrypted data stored in the database 504 mapping with the user identifier, and then decrypt the encrypted data using the protection key to obtain original data. The application server 501 may further send the original data to the user device.

Figure 8:
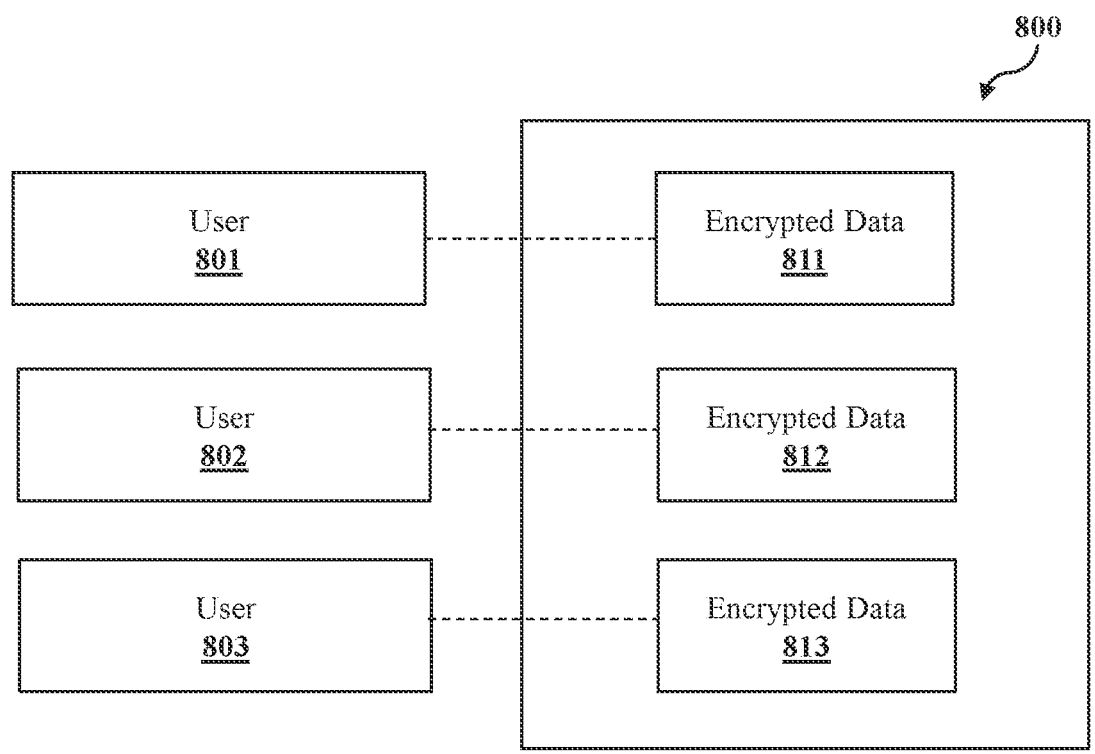
FIG. 8 depicts a schematic diagram of an example database according to embodiments of the present invention.

Referring now to FIG. 8, an example database 800 according to embodiments of the present disclosure is depicted. The database 800 can be the database 504 in FIG. 5, and data of each user can be encrypted using a data key specific to the user. For example, data of user 801 can be encrypted as encrypted data 811 and stored in the database 800, data of user 802 can be encrypted as encrypted data 812 and stored in the database 800, and data of user 803 can be encrypted as encrypted data 813 and stored in the database 800. Each user can be assigned with a unique key to encrypt/decrypt data.

According to embodiments of the present disclosure, the application server 501 may only store the encrypted data key and the first encrypted protection key after registration of a user. The key protection device 503 may only store the asymmetric key pair after registration of the user. The authorization device 502 may keep the mapping relationship between user identifiers and each set of key identifiers (key identifier 1, key identifier 2 and key identifier 3). Data of each user stored in the database 800 can be protected from unauthorized access.

Figure 9:
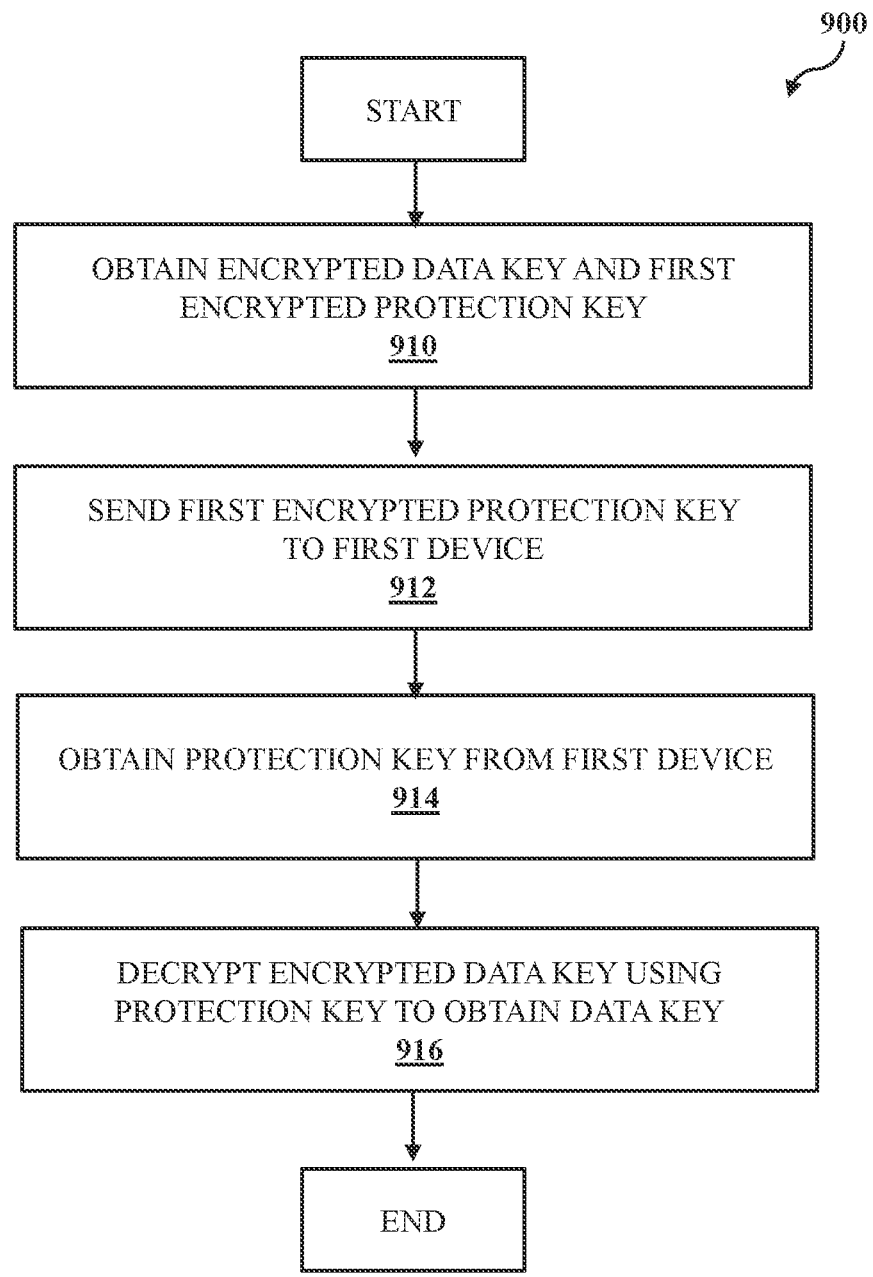
FIG. 9 depicts a flowchart of an example method for data protection according to embodiments of the present invention.

Referring now to FIG. 9, a schematic flowchart 900 of a method for data protection according to an embodiment of the present disclosure is depicted. The method can be implemented by the computer system/server 12 of FIG. 1, or a device in a network environment. In some embodiments, the method can be implemented by the application server 501 of FIG. 5. It should be noted that the method is only illustrative and is not intended to suggest any limitation as to the scope of use or functionality of embodiments of the present disclosure.

At block 910, one or more processing units may obtain an encrypted data key and a first encrypted protection key from a storage device. In some embodiments, the one or more processing units can be comprised in the application server 501 of FIG. 5, and the storage device can be accessible by the one or more processing units.

Then, at block 912, one or more processing units may send the first encrypted protection key to a first device. In some embodiments, the first device can be the key protection device 503 of FIG. 5.

At block 914, one or more processing units may obtain a protection key from the first device, wherein the protection key is generated by the first device through decrypting the first encrypted protection key. At block 916, one or more processing units may decrypt the encrypted data key using the protection key to obtain a data key.

In some embodiments, one or more processing units may encrypt data received from a user device using the data key. Then, the encrypted data can be stored in a database.

In some embodiments, one or more processing units may decrypt encrypted data obtained from the database using the data key to obtain original data, and then send the original data to the user device.

In some embodiments, one or more processing units may send a user identifier to a second device. As an example, the second device can be the authorization device 502 of FIG. 5. The one or more processing units may receive a first key identifier and a second key identifier from the second device, wherein the first key identifier corresponds to the encrypted data key and the second key identifier corresponds to the first encrypted protection key. The obtaining the encrypted data key and the first encrypted protection key at block 910 may comprise: one or more processing units may obtain the encrypted data key and the first encrypted protection key through searching in the storage device using the first key identifier and the second key identifier.

In some embodiments, the protection key may be generated by the first device through decrypting the first encrypted protection key using a private key of an asymmetric key pair obtained previously by the first device.

In some embodiments, the private key of the asymmetric key pair may be obtained from a second storage device accessible by the first device using a third key identifier received from the second device, and the third key identifier maps with the first key identifier and the second key identifier.

In some embodiments, obtaining the protection key from the first device may further comprises: one or more processing units may receive a second encrypted protection key from the first device, wherein the second encrypted protection key may be generated by the first device through encrypting the protection key using a first session key, and then decrypt the second encrypted protection key to obtain the protection key using a second session key.

In some embodiments, the first session key and the second session key may be a pair of asymmetric keys, and the first session key may be a public key of the pair of asymmetric keys sent to the first device.

In some embodiments, the first session key and the second session key may be symmetric keys.

In some embodiments, the encrypted data key and the first encrypted protection key may be stored in the storage device previously by the following steps: one or more processing units may receive the first encrypted protection key and the protection key from the first device, wherein the first encrypted protection key may be generated by the first device through encrypting the protection key using a public key of the asymmetric key pair, obtain a data key, encrypt the data key using the protection key to obtain the encrypted data key, and store the encrypted data key and the first encrypted protection key in the storage device. The above steps can be implemented by one or more processing units during a registration process described referring to FIG. 6.

In some embodiments, the above storing the encrypted data key and the first encrypted protection key during the registration process may further comprise: one or more processing units may receive the first key identifier and the second key identifier from the second device, store the encrypted data key with the first key identifier, and store the second encrypted protection key with the second key identifier.

In some embodiments, the above receiving the protection key from the first device may further comprise: one or more processing units may receive a third encrypted protection key from the first device, wherein the third encrypted protection key may be generated by the first device through encrypting the protection key using a third session key, and decrypt the third encrypted protection key using a fourth session key to obtain the protection key.

It should be noted that the processing of data protection according to embodiments of the present disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for data protection, comprising:
    obtaining, by one or more processors, an encrypted data key and a first encrypted protection key from a storage device;
    sending, by one or more processors, the first encrypted protection key to a first device;
    receiving, by one or more processors, a second encrypted protection key from the first device, wherein the second encrypted protection key is generated by the first device through:
        decrypting the first encrypted protection key, resulting in a protection key, and encrypting the protection key using a first session key;
    decrypting, by one or more processors, the second encrypted protection key using a second session key; and
    decrypting, by one or more processors, the encrypted data key using the protection key to obtain a data key.

2. The computer-implemented method of claim 1, further comprising:
    encrypting, by one or more processors, data received from a user device using the data key.

3. The computer-implemented method of claim 1, further comprising:
    decrypting, by one or more processors, encrypted data obtained from a database using the data key to obtain original data; and
    sending, by one or more processors, the original data to a user device.

4. The computer-implemented method of claim 1, further comprising:
    sending, by one or more processors, a user identifier to a second device; and
    receiving, by one or more processors, a first key identifier and a second key identifier from the second device, wherein:
        the first key identifier corresponds to the encrypted data key;
        the second key identifier corresponds to the first encrypted protection key; and
        obtaining the encrypted data key and the first encrypted protection key comprises obtaining, by one or more processors, the encrypted data key and the first encrypted protection key through searching in the storage device using the first key identifier and the second key identifier.

5. The computer-implemented method of claim 1, wherein the protection key is generated by the first device through decrypting the first encrypted protection key using a private key of an asymmetric key pair obtained previously by the first device.

6. The computer-implemented method of claim 5, wherein the private key of the asymmetric key pair is obtained from a second storage device accessible by the first device using a third key identifier received from the second device, and the third key identifier maps with a first key identifier and a second key identifier.

7. The computer-implemented method of claim 1, wherein:
    the first session key and the second session key are a pair of asymmetric keys; and
    the first session key is a public key of the pair of asymmetric keys sent to the first device.

8. The computer-implemented method of claim 1, wherein the first session key and the second session key are symmetric keys.

9. The computer-implemented method of claim 1, further comprising:
    obtaining, by one or more processors, the first encrypted protection key and the protection key from the first device, wherein the first encrypted protection key is generated by the first device through encrypting the protection key using a public key of an asymmetric key pair;
    obtaining, by one or more processors, the data key;
    encrypting, by one or more processors, the data key using the protection key to obtain the encrypted data key; and
    storing, by one or more processors, the encrypted data key and the first encrypted protection key in the storage device.

10. The computer-implemented method of claim 9, further comprising:
    receiving, by one or more processors, a first key identifier and a second key identifier from the second device;
    storing, by one or more processors, the encrypted data key with the first key identifier; and
    storing, by one or more processors, the first encrypted protection key with the second key identifier.

11. The computer-implemented method of claim 9, wherein obtaining the protection key from the first device further comprises:
    receiving, by one or more processors, a third encrypted protection key from the first device, wherein the third encrypted protection key is generated by the first device through encrypting the protection key using a third session key; and decrypting, by one or more processors, the third encrypted protection key using a fourth session key to obtain the protection key.

12. A computer program product comprising:
one or more computer readable storage media, and program instructions collectively stored on the one or more computer readable storage media, the program instructions comprising:
program instructions to obtain an encrypted data key and a first encrypted protection key from a storage device;
program instructions to send the first encrypted protection key to a first device;
program instructions to receive a second encrypted protection key from the first device, wherein the second encrypted protection key is generated by the first device through:
decrypting the first encrypted protection key, resulting in a protection key, and encrypting the protection key using a first session key;
program instructions to decrypt the second encrypted protection key using a second session key; and
program instructions to decrypt the encrypted data key using the protection key to obtain a data key.

13. The computer program product of claim 12, further comprising:
program instructions, collectively stored on the one or more computer readable storage media, to encrypt data received from a user device using the data key.

14. The computer program product of claim 12, further comprising:
program instructions, collectively stored on the one or more computer readable storage media, to decrypt encrypted data obtained from a database using the data key to obtain original data; and
program instructions, collectively stored on the one or more computer readable storage media, to send the original data to a user device.

15. The computer program product of claim 12, further comprising:
program instructions, collectively stored on the one or more computer readable storage media, to send a user identifier to a second device; and
program instructions, collectively stored on the one or more computer readable storage media, to receive a first key identifier and a second key identifier from the second device, wherein:
the first key identifier corresponds to the encrypted data key;
the second key identifier corresponds to the first encrypted protection key; and
program instructions to obtain the encrypted data key and the first encrypted protection key comprise program instructions to obtain the encrypted data key and the first encrypted protection key through searching in the storage device using the first key identifier and the second key identifier.

16. The computer program product of claim 12, wherein the protection key is generated by the first device through decrypting the first encrypted protection key using a private key of an asymmetric key pair obtained previously by the first device.

17. The computer program product of claim 16, wherein the private key of the asymmetric key pair is obtained from a second storage device accessible by the first device using a third key identifier received from the second device, and the third key identifier maps with a first key identifier and a second key identifier.

18. A computer system comprising:
one or more computer processors, one or more computer readable storage media, and program instructions collectively stored on the one or more computer readable storage media for execution by at least one of the one or more computer processors, the program instructions comprising:
program instructions to obtain an encrypted data key and a first encrypted protection key from a storage device;
program instructions to send the first encrypted protection key to a first device;
program instructions to receive a second encrypted protection key from the first device, wherein the second encrypted protection key is generated by the first device through:
decrypting the first encrypted protection key, resulting in a protection key, and encrypting the protection key using a first session key;
program instructions to decrypt the second encrypted protection key using a second session key; and
program instructions to decrypt the encrypted data key using the protection key to obtain a data key.

* * * * *